US012079740B2

(12) United States Patent
LeMoine et al.

(10) Patent No.: US 12,079,740 B2
(45) Date of Patent: Sep. 3, 2024

(54) DISAMBIGUATION OF AGRICULTURAL INPUT

(71) Applicant: Deere & Company, Moline, IL (US)

(72) Inventors: Marc LeMoine, Bettendorf, IA (US);
Catherine Schwartz, Alexandria, VA (US); Erik E. Stein, Gaithersburg, MD (US); Zachary Price, Alexandria, VA (US); John A. Sipple, Potomac Falls, VA (US)

(73) Assignee: Deere & Company, Moline, IL (US)

( * ) Notice: Subject to any disclaimer, the term of this patent is extended or adjusted under 35 U.S.C. 154(b) by 1424 days.

(21) Appl. No.: 15/168,944

(22) Filed: May 31, 2016

(65) Prior Publication Data

US 2017/0344896 A1     Nov. 30, 2017

(51) Int. Cl.
*G06N 7/01*          (2023.01)
*G06F 16/242*        (2019.01)

(52) U.S. Cl.
CPC .............. *G06N 7/01* (2023.01); *G06F 16/242* (2019.01)

(58) Field of Classification Search
CPC ............. A01B 79/00–02; G06Q 50/02; G06N 5/00–048; G06F 16/242–24528
USPC ............................... 706/12–62; 707/758–780
See application file for complete search history.

(56) References Cited

U.S. PATENT DOCUMENTS

| 7,085,709 | B2 | 8/2006 | Panttaja |
| 8,412,406 | B2 | 4/2013 | Johnson et al. |
| 8,799,237 | B2 | 8/2014 | Walsh et al. |
| 2006/0248458 | A1* | 11/2006 | Li ..................... G06F 16/3344 715/700 |
| 2007/0027856 | A1* | 2/2007 | Lee ....................... G06F 16/954 |
| 2008/0263023 | A1* | 10/2008 | Vailaya ................. G06F 16/148 |
| 2010/0179956 | A1* | 7/2010 | Jammalamadaka ... G06Q 30/02 707/748 |
| 2011/0113063 | A1* | 5/2011 | Schulman ............. G06F 16/907 707/771 |
| 2012/0066253 | A1* | 3/2012 | Osborn .............. G06Q 30/0201 707/769 |
| 2012/0278356 | A1* | 11/2012 | Furuta ................... G06F 40/129 707/769 |

(Continued)

*Primary Examiner* — Daniel T Pellett
(74) *Attorney, Agent, or Firm* — James P. Muraff; McDonald Hopkins LLC (57) ABSTRACT

Systems and methods for disambiguation of agricultural input are disclosed. An example disclosed method includes determining a first probability for a second product specifier. The first probability indicates a likelihood that the second product specifier is correct. Additionally, the example method includes, in response to determining that agricultural input identifiers for a manufacturer associated with a portion of the first product specifier are in a variety database, modifying the first probability with a second probability. The example method includes, in response to determining that the agricultural input identifiers for the manufacturer associated with the portion of the first product specifier are not in the variety database, modifying the first probability with a third probability different from the second probability. The example method includes comparing the modified first probability with a threshold, and associating the second product specifier with the vehicle location when the modified first probability satisfies the threshold.

24 Claims, 4 Drawing Sheets

(56) References Cited

U.S. PATENT DOCUMENTS

| | | | |
|---|---|---|---|
| 2013/0246219 A1* | 9/2013 | Mishanski | G06Q 30/00 |
| | | | 705/26.9 |
| 2013/0311506 A1 | 11/2013 | Taubman et al. | |
| 2016/0086291 A1* | 3/2016 | Hunt | G06Q 10/06393 |
| | | | 700/275 |
| 2016/0308954 A1* | 10/2016 | Wilbur | H04L 67/18 |
| 2017/0105335 A1* | 4/2017 | Xu | A01C 7/102 |

* cited by examiner

DISAMBIGUATION OF AGRICULTURAL INPUT

TECHNICAL FIELD

The present disclosure generally relates to agricultural cultivation and, more specifically, disambiguation of agricultural input into electronic documentation systems.

BACKGROUND

Modern farm management practices rely on accurate, detailed data to create, execute, and analyze farm management plans. These farm management plans facilitate a farmer precisely deploying seeds, fertilizer, and pesticides based on factors, such as soil conditions, weather, irrigation availability. The farm management plans increase the efficiency of the farm and decrease the environmental impact of the farm by facilitating a farmer to deploy fertilizer and pesticides in a targeted manner.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for disambiguation of agricultural input are disclosed. In an example disclosed method, a central electronic data processing system receives vehicle activity data from a vehicle, such as a tractor, a seed planter, or a fertilizer. The vehicle activity data includes a first product specifier and a vehicle location. A product disambiguator generates a second product specifier that may be comprised of a single hypothesis or series of hypothesis rank ordered with statistical confidence. The second product specifier is based on a transformation from the first product specifier. The product disambiguator determines a first probability for the second product specifier. The first probability indicates a likelihood that the second product specifier is correct. In response to determining that agricultural input identifiers for a manufacturer associated with a portion of the first product specifier are in a variety database, the product disambiguator modifies the first probability with a second probability. Additionally, in response to determining that the agricultural input identifiers for the manufacturer associated with the portion of the first product specifier are not in the variety database, the product disambiguator modifies the first probability with a third probability. The third probability is different from the second probability. The product disambiguator compares the modified first probability with a threshold. The product disambiguator associates the second product specifier with the vehicle location when the modified first probability satisfies the threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Modern farm management uses navigation, sensors, and deployment devices to develop, execute, and document farm management plans. Accurate documentation of agricultural products (e.g., seeds, fertilizer, pesticides, etc.) deployed at locations on the farm increases the capability of farm management. Modern farm equipment includes displays that facilitate providing information about and executing the farm management plans. Often, the agricultural products are entered manually into the displays. However, an operator may enter an agricultural input identifier (e.g., a name, a serial number, a stock keeping unit (SKU), a universal product code (UPC), etc.) and/or a format of the agricultural input identifier incorrectly. For example, a serial number "S05-ATD217" may be entered into the display as "SO5ATD317." Such errors cause difficulties for farm management systems. For example, the errors prevent the farm management system from locating all acres where an agricultural product was deployed and compare the performance of fields where the same agricultural product was deployed. In the past, agricultural input identifier validation methods have largely been done through personal validation via phone calls or direct conversations.

As disclosed in more detail below, a product disambiguator analyzes the agricultural input identifiers (sometimes referred to herein as "product specifiers") entered by an operators. The product disambiguator validates and determines possible corrections to the agricultural input identifiers based on two parts; the first being a description of the format of the first product specifier and the second the serial string or alpha-numeric part that distinguishes products from each other. The possible corrections to the agricultural input identifiers may be presented to the operator for review via display on the vehicle or a separate terminal (e.g., a smart phone a desktop computer, a laptop computer, a tablet, etc.) The product disambiguator may analyze the agricultural input identifiers in bulk from time-to-time (e.g., daily, weekly, monthly, etc.). Alternatively, the product disambiguator may analyze the agricultural input identifiers shortly after being entered by the operator to facilitate timely review of the corrected agricultural input identifiers.

Figure 1:
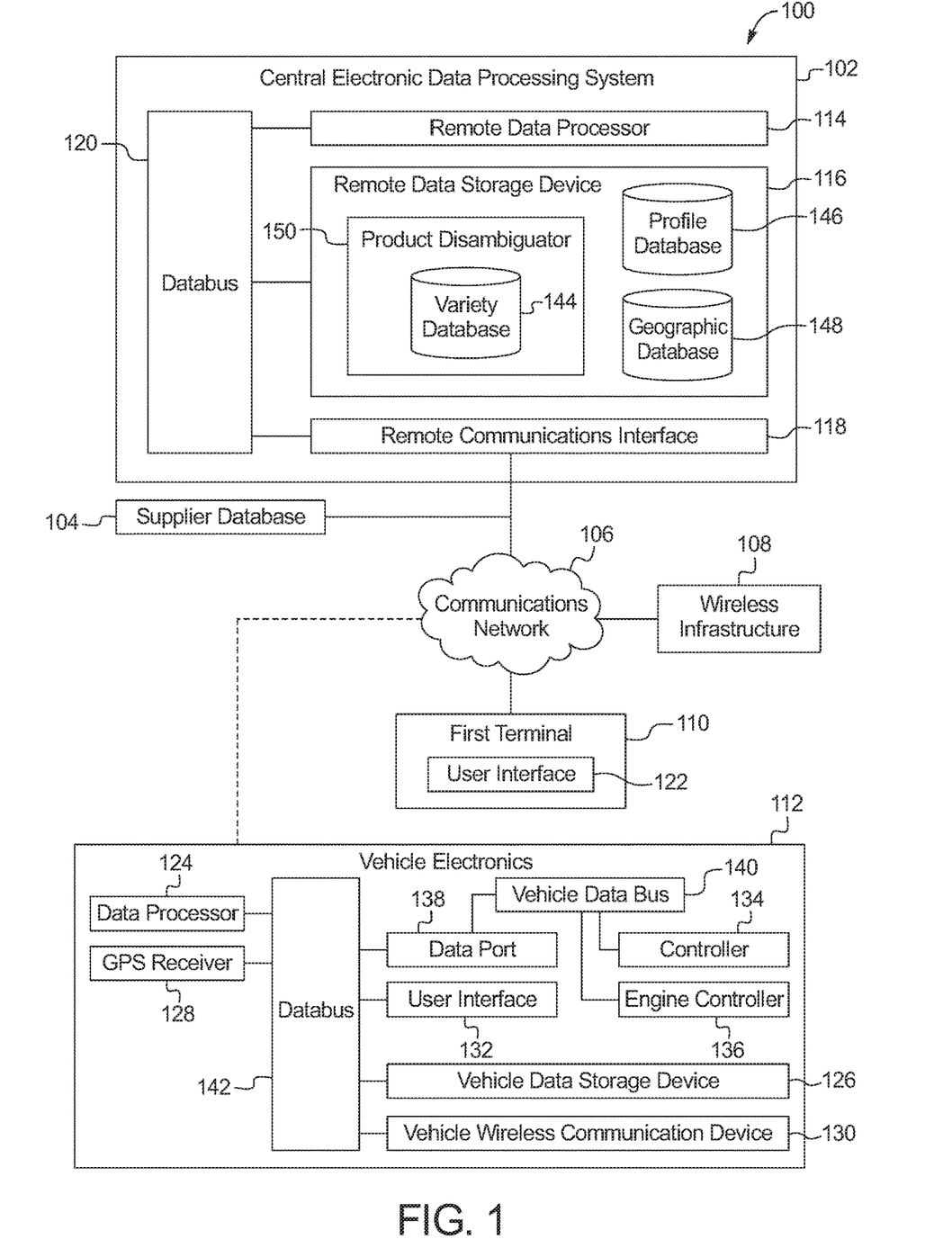
FIG. 1 depicts a block diagram of a system configured to disambiguate agricultural input in accordance with the teachings of this disclosure.

FIG. 1 depicts a block diagram of a system 100 configured to disambiguate agricultural input in accordance with the teachings of this disclosure. In the illustrated examples, the system includes a central electronic data processing system 102, a supplier database(s) 104, a communications network 106, wireless infrastructure 108, a first terminal 110, and a vehicle 112.

The central electronic data processing system 102 is maintained by any suitable entity (e.g., an equipment manufacturer, a government agency, a university, an insurance agency, a cooperative, a professional and/or commercial association, etc.) that provides agricultural support services to operators of agricultural equipment. The central electronic data processing system 102 receives messages from the vehicle 112. The product message includes a product specifier (sometimes referred to herein as "an operator product specifier") and a position (e.g., latitude coordinates and longitude coordinates, etc.) of the vehicle 112. The product specifier is an alphanumeric value entered by an operator of the vehicle 112. The position identifies the location at which the agricultural product identified (or identifiable by) the product identifier was used. The central electronic data processing system 102 validates and/or corrects the provisional product identifier, and associates the validated product identifier with the position of the vehicle 112.

The central electronic data processing system 102 includes a remote data processor 114, a remote data storage device 116, a remote communications interface 118, and a data bus 120. As used herein, the term "remote" is defined to be components that are not incorporated into the vehicle 112 and does not define a distance from the vehicle 112. For example, a component is remote if it is not incorporated into the vehicle 112, but is incorporated into an object next to the vehicle 112. The remote data processor 114 may be any suitable processing device or set of processing devices such as, but not limited to: a microprocessor, a microcontroller-based platform, a suitable integrated circuit, one or more field programmable gate arrays ("FPGAs"), and/or one or more application-specific integrated circuits ("ASICs").

The remote data storage device 116 includes volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), and/or any high-capacity storage devices, such as hard drives, and/or a solid state drives. The remote data storage devices 116 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the remote data storage device 116, the computer readable medium, and/or within the remote data processor 114 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals. As used herein, the term "non-transitory computer readable medium" is expressly defined to include any article of manufacture capable of storing, encoding or carrying a set of instructions, regardless of the duration of the storing, encoding or carrying.

The remote communications interface 118 facilitates the central electronic data processing system 102 communicating with other devices connected to the communications network 106. The remote communications interface 118 include a communication device, such as a modem or a network interface card, to facilitate exchange of data with the vehicle 112 and/or the first terminal 110 via a network connection (e.g., an Ethernet connection, a digital subscriber line (DSL), a telephone line, coaxial cable, a cellular telephone system, a Bluetooth connection, etc.). The remote communications interface 118 may utilize a variety of networking protocols now available or later developed including, but not limited to, TCP/IP-based networking protocols. The data bus 120 communicatively couples the remote data processor 114, the remote data storage device 116, and the remote communications interface 118. The data bus 120 may be implemented by one or more interface standards, such as an Ethernet interface, a USB interface, PCI express interface, and/or a Serial ATA interface, etc.

The supplier database(s) 104 include(s) product specifiers and/or specifier formats from different manufacturer(s) of agricultural products (e.g., seeds, fertilizer, pesticides, etc.) that is/are maintains by the respective manufacturer and made available to the central electronic data processing system 102. The product specifiers include agricultural input identifiers (e.g., names, serial numbers, stock keeping units (SKUs), universal product codes (UPCs), etc.). The agricultural input identifiers are numeric or alphanumeric values that uniquely identify the product to the particular manufacturer. The specifier formats define patterns for the serial numbers using alphabetic literals, numeric literals, alphabetic wildcard characters, numeric wildcard characters, and/or delimiter literals. For example, a format may specify that serial numbers for a particular seed product line will have the form of "PnnnnATM," where the "n" represents a wildcard numerical character. As another example, the serial number for a particular variety of seed may be "P1957 ATM." In some examples, the serial numbers and the specifier formats include an alias (e.g., as a prefix, as a suffix, etc.) that identifies the particular manufacturer. For example, the "P" in "PnnnnATM" may be an alias of a particular manufacturer. Different manufacturers may provide different information in their supplier database 104. For example, a first manufacturer may only include specifier formats and a second manufacturer may include specifier formats and serial numbers.

The communications network 106 may be a public network, such as the Internet; a private network, such as an intranet; or combinations thereof. The wireless infrastructure 108 communicatively couples the vehicle 112 to the communications network 106. The wireless infrastructure 108 may facilitate a wide area network (e.g., such as a cellular network (e.g., Global System for Mobile Communications ("GSM"), Universal Mobile Telecommunications System ("UMTS"), Long Term Evolution ("LTE"), Code Division Multiple Access ("CDMA"), etc.), a satellite communication network, WiMAX ("IEEE 802.16m), etc.) and/or a location area network (e.g., IEEE 802.11 a/b/g/n/ac, etc.).

The first terminal 110 is a computing device (e.g., a desktop, a laptop, a tablet, a smart phone, etc.) accessible to an operator of the vehicle 112. In the illustrated example, the first terminal 110 includes a user interface 122. The user interface 122 provides an interface between the operator and the central electronic data processing system 102 and/or the vehicle 112. The user interface 122 may be used, for example, to retrieve information (e.g, route information, maintenance information etc.) from the vehicle 112 and information (e.g., crop growth tracking, weather forecasts, etc.) from the central electronic data processing system 102. Additionally, the user interface 122 may be used to input information (e.g., product information, route information, etc.) to the central electronic data processing system 102 and/or the vehicle 112. The user interface 122 receives, from time to time, product specifiers to be presented to the operator to facilitate the operator reviewing a product specifier modified by the central electronic data processing system 102.

The vehicle 112 of the illustrated example is any suitable vehicle (e.g., a tractor, a seeder, a fertilizer spreader, etc.) that distributes agricultural products (e.g., seeds, fertilizer, pesticides, etc.) in a planting area. In the illustrated example, the vehicle 112 includes a data processor 124, a vehicle data storage device 126, a global positioning system (GPS) receiver 128, a vehicle wireless communication device 130, a user interface 132, controllers 134, an engine controller 136, a data port 138, a vehicle data bus 140, and a data bus 142.

The data processor 124 may be any suitable processing device or set of processing devices such as, but not limited to: a microprocessor, a microcontroller-based platform, a suitable integrated circuit, one or more field programmable gate arrays ("FPGAs"), and/or one or more application-specific integrated circuits ("ASICs"). The vehicle data storage device 126 includes volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), and/or any high-capacity storage devices, such as hard drives, and/or a solid state drives. The vehicle data storage devices 126 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the data processor 124, the computer readable medium, and/or within the remote data processor 114 during execution of the instructions.

The GPS receiver 128 receives signals that provide the coordinates (e.g., longitude and latitude) of the vehicle 112. While the term "GPS" is used herein, the GPS receiver 128 may be compatible with other satellite-based navigation systems, such as Global Navigation Satellite System (GLONASS), Galileo, and/or BeiDou Navigation Satellite System, etc. The vehicle wireless communication device 130 includes one or more controllers for standards-based networks (e.g., GSM, UMTS, LTE, CDMA, WiMAX, etc.), satellite communication networks, and/or wireless local area networks (e.g., WiFi®, Wireless Gigabit, etc.), etc. In some examples, the vehicle wireless communication device 130 includes controllers for personal area networks (e.g., Bluetooth®, ZigBee® ("IEEE 802.15.4"), Near Field Communication ("NFC"), etc.) to communicatively couple the vehicle 112 to a mobile device (e.g., a smart phone, a tablet, a smart watch, etc.).

The user interface 132 provides an interface between the vehicle 112 and the operator. The user interface 132 includes digital and/or analog interfaces (e.g., input devices and output devices) to receive input from the operator and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. Additionally, the user interface 132 includes a graphic user interface (GUI) to present information to the operator and to receive input from the operator.

The operator uses the user interface 132 to input a product specifier that identifies or is meant to identify the agricultural product that the vehicle 112 deploys at a location. In some examples, the user interface 132 receives product specifiers to be presented to the operator to facilitate the operator reviewing a product specifier modified by the central electronic data processing system 102. The vehicle 112, via the vehicle wireless communication device 130, sends a message with (a) the product specifier input into the user interface 132 and (b) the location of the vehicle 112 identified by the GPS receiver 128 to the central electronic data processing system 102. Alternatively or additionally, in some examples, the vehicle 112 saves the message to a removable medium (e.g., a flash drive, a floppy disk, etc.) to facilitate the operator sending the message via the first terminal 110.

The controllers 134 monitor and control the subsystems of the vehicle 112. The controllers 134 are discrete sets of electronics that include their own circuit(s) (such as integrated circuits, microprocessors, memory, storage, etc.) and firmware, sensors, actuators, and/or mounting hardware. For example, one of the controllers 134 may control a fertilizer spreader attached to a tractor to precisely apply fertilizer to an area. The engine controller 136 controls subsystems of the vehicle 112 related to engine performance, such as ignition, fuel injection, and spark plug timing, electronic valve control, idle speed control, etc.

The data port 138 is a gateway between the vehicle data bus 140 and the data bus 142. The data port 138 communicatively couples the vehicle data bus 140 and the data bus 142 to facilitate the electronics (e.g., the controllers 134, the engine controller 136, etc.) communicatively connected to the vehicle data bus 140 communicating with the electronics (e.g., the data processor 124, the vehicle data storage device 126, the GPS receiver 128, the vehicle wireless communication device 130, the user interface 132, etc.) communicatively coupled to the data bus 142. The vehicle data bus 140 communicatively couples the controllers 134, the engine controller 136, and the data port 138. In some examples, the vehicle data bus 140 is implemented in accordance with the controller area network ("CAN") bus protocol as defined by International Standards Organization ("ISO") 11898-1. Alternatively, in some examples, the vehicle data bus 140 may be a different bus protocol, such as a Media Oriented Systems Transport ("MOST") bus, a CAN flexible data ("CAN-FD") bus (defined by ISO 11898-7), or an Ethernet bus, etc. The data bus 142 communicatively couples the data processor 124, the vehicle data storage device 126, the GPS receiver 128, the vehicle wireless communication device 130, the user interface 132, and the data port 138. The data bus 142 may be implemented by one or more interface standards, such as an Ethernet interface, a USB interface, PCI express interface, and/or a Serial ATA interface, etc.

In the illustrated example, the central electronic data processing system 102 includes a variety database 144, a profile database 146, a geographic database 148, and a product disambiguator 150. The variety database 144 includes product specifiers and/or specifier formats retrieved from the supplier databases 104. The central electronic data processing system 102, from time to time (e.g. periodically, aperiodically, etc.), updates the variety database 144 by importing the product specifiers and/or the specifier formats from the supplier databases 104. In some examples, because the amount of information included in the product specifiers varies from supplier to supplier, the variety database 144 may include specifier formats and/or serial numbers for the agricultural products based on the associated manufacturer. In some examples, the variety database 144 is segmented based on product type (e.g., seeds, fertilizer, pesticides, etc.).

The profile database 146 includes profiles of operators. The profiles include geographic descriptors of land associated with the corresponding operator, agricultural products that the operator has previously deployed on that land, and associated deployment dates. The geographic database 148 includes field documentation data. In some examples, the field documentation data includes geographic descriptors of land organized by (a) region (e.g., a county, a state, etc.) and/or (b) similarity (e.g, soil types, climate, irrigation, etc.). The field documentation data in the geographic database 148 also includes agricultural products that have previously deployed on the land identified by the geographic descriptors, and associated deployment dates.

As discussed in more detail in connection with FIG. 2 below, the product disambiguator 150 verifies and/or corrects the product specifiers supplied, for example, via the user interface 132 of the vehicle 112, by the operator. As used herein, the process of verifying and/or correcting the product specifiers is referred to as "disambiguation." As used herein, product specifiers supplied by the operator are referred to as "operator product specifiers" and product specifiers disambiguated by the product disambiguator 150 are referred to as "modified product specifiers." The product disambiguator 150 compares the operator product specifier to product specifiers in the variety database 144. If the operator product specifier matches one of the product specifiers in the variety database 144, product disambiguator 150 designates the operator product specifier as correct.

Otherwise, if the operator product specifier does not match one of the product specifiers in the variety database 144, the product disambiguator 150 generates one or more hypotheses that the operator product specifiers is meant to identify one of the product specifiers in the variety database 144. A hypothesis includes a serial number of a product and a probability that the operator product specifiers is meant to be that product. As used herein, probability that the operator product specifiers is meant to be a particular product specifier is sometimes referred to as a "statistical confidence." The product disambiguator 150 filters the hypotheses by applying a probability threshold to the statistical confidences associated with the hypotheses to generate a set of one or more of the modified product specifiers. In some examples, when the product disambiguator 150 generates multiple hypotheses, the hypotheses in the set are ranked in order of statistical confidence. Additionally, the product disambiguator 150 sends the set of the modified product specifiers to the first terminal 110 and/or the vehicle 112 to be presented to the operator via the user interfaces 122 and 132. In some examples, when the set of modified product specifiers are sent to the vehicle 112, and the operator selects one of the modified product specifiers in the set, the operation of the vehicle 112 changes. In some such examples, the corrected product specifiers causes the vehicle 112 to change, for example, the dispersal rate and/or pattern of the agricultural product associated with the modified product specifier.

Figure 2:
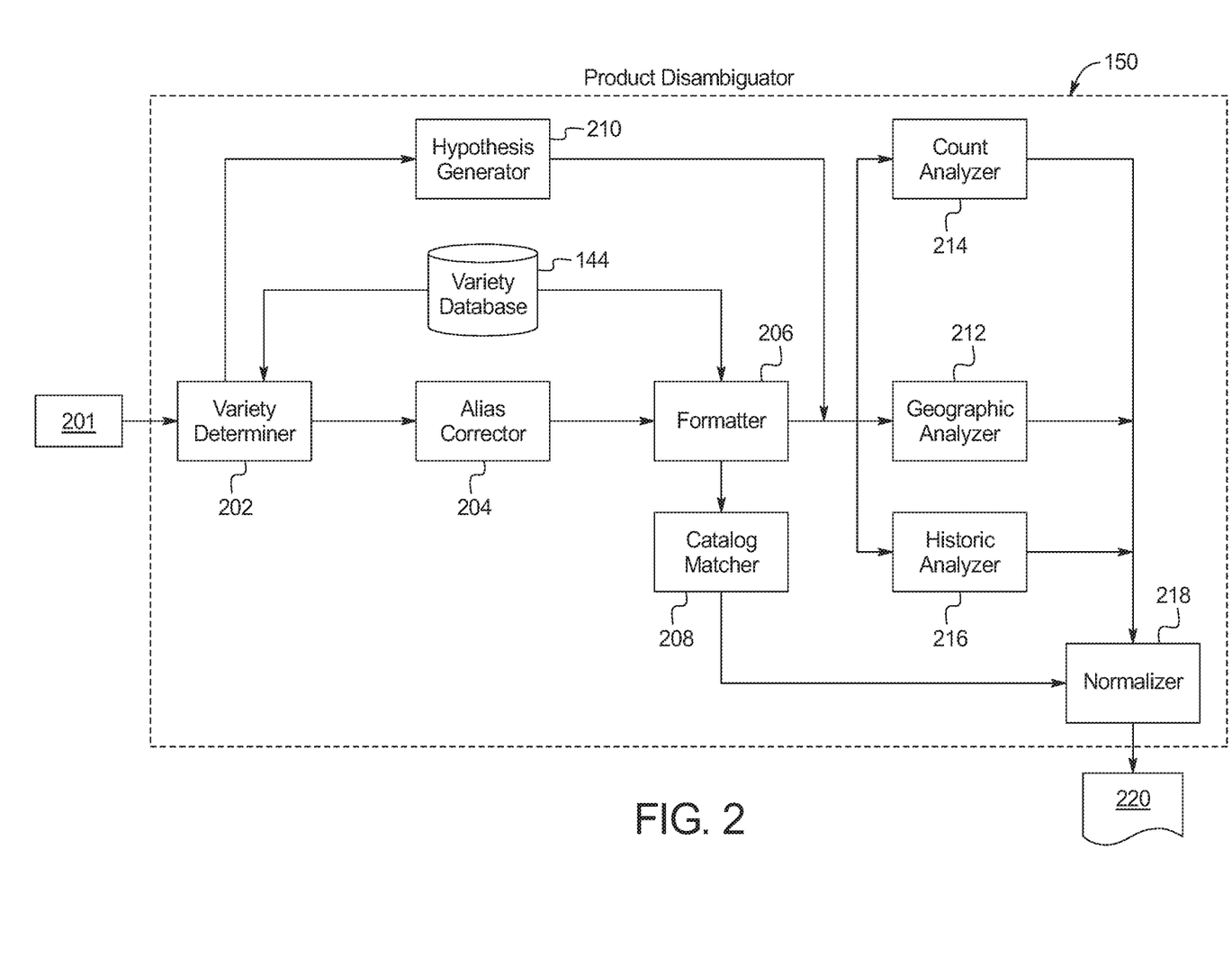
FIG. 2 depicts a block diagram of the product disambiguator of FIG. 1.

FIG. 2 depicts a block diagram of the product disambiguator 150 of FIG. 1. The product disambiguator 150 (a) verifies and/or corrects the product specifiers supplied by the operator of the vehicle 112, and (b) generates the set of modified product specifiers. In the illustrated example, the product disambiguator 150 includes a variety determiner 202, an alias corrector 204, a formatter 206, a catalog matcher 208, a hypothesis generator 210, a geographic analyzer 212, a count analyzer 214, a historic analyzer 216, and a normalizer 218.

The variety determiner 202 receives, from the vehicle 112 or the first terminal 110, the operator message 201 that includes the operator product specifier, the category (e.g., seed, fertilizer, pesticide, etc.) of the product specifier, and the location. The variety determiner 202 determines the category of the product specifier and the manufacturer associated with the operator product specifier. The variety determiner 202 maintains a list of (ii) product specifier prefixes for the manufacturers, and (ii) common nicknames and/or mistaken product specifier prefixes for the manufacturers. If the manufacturer is identifiable (e.g., the product specifier prefix of the operator product specifier is on the list maintained by the variety determiner 202), the variety determiner 202 prevents hypotheses from being generated for product specifiers of other manufacturers. For example, if the category is "seed" and the operator product specifier has a prefix of "GSU" corresponding to "General Seed Unlimited," the variety determiner 202 may prevent hypotheses from being generated base on product specifiers for "Acme Seed Company" and "Universal Seed Imports."

The alias corrector 204 replaces any "unofficial" manufacturer prefixes with the official manufacturer prefixes. The "unofficial" manufacturer prefixes are wrong, but commonly entered, prefixes entered by the operators to identify a manufacturer. The alias corrector 204 maintains a list that associates the "unofficial" manufacturer prefixes with the manufacturer prefix specified by the manufacturer. For example, the operator may enter "Gen SU 7388TW" as a product specifier, where "Gen SU" is a common unofficial prefix to identify "General Seed Unlimited." In such an example, the alias corrector 204 may change "Gen SU 7388TW" to "GSU 7388TW." When the alias corrector 204 corrects a prefix, it does not affect the statistical confidences associated with hypotheses generated based on the operator product specifier.

The formatter 206 generates hypotheses when the variety database 144 includes format information for the manufacturer identified by the variety determiner 202. The formatter 206 generates hypotheses based on specifier formats in variety database 144 for the manufacturer identified by the variety determiner 202. The hypotheses generated by the formatter include a base probability ($P_B$) and the formatted product specifier. The formatter 206 may generate a series of hypotheses corresponding to different formats for the operator product specifier received from the alias corrector 204. To determine the base probability ($P_B$) for a particular hypothesis, the formatter 206 calculates a minimum cost edit-distance transformation from the operator product specifier to the corresponding manufacturer product specifier. To transform the operator product specifier to the manufacturer product specifier, the formatter 206 selects, character-by-character, a sequence of insertion (I), deletion (D), replacement (R), or match (M) operations that maximizes the probability. An example transformation is illustrated on Table (1) below.

TABLE 1

Example Transformation From Operator Product Specifier to Manufacturer Product Specifier

| | |
|---|---|
| Operator Product Specifier: | GSU_7388T W_Seed |
| Manufacturer Product Specifier: | GSU nnnnTAW |
| Transformation: | MMMDMMMMMIMDDDDD |

The formatter 206 considers multiple delete operations to be a single error instead of multiple errors. Additionally, the formatter 206 considers wild card characters to match if the corresponding character in the operator product specifier matches the type of wild card character. In some examples, the wild card character "n" matches numeric characters (e.g., 0 to 9), the wild card character "a" matches alphabetic characters (e.g., A to Z), and the wild card character "t" matches alphanumeric characters (e.g., 0 to 9 and A to Z).

To computer the sequence of operations that maximizes the probability, the formatter generates a probability matrix Q with m rows and n columns, where m is the length of the operator product specifier+1 and n is the length of the target manufacturer product specifier+1. Iterating across row i and column j, the formatter 206 chooses an operation with the greater conditional probability in accordance with Equation (1) below.

$$Q(i,j)=\max[Q_I(i,j),Q_D(i,j),Q_R(i,j),Q_M(i,j)]  \quad \text{Equation (1)}$$

In Equation (1) above, $Q_I(i,j)$, $Q_D(i,j)$, $Q_R(i,j)$, and $Q_M(i,j)$ are based on (a) a conditional probability computed for the previous operation, (b) a probability cost associated with the current operation, and (c) a probability cost associated with a character type (e.g., alphabetic literal, numeric literal, numeric wild card, literal delimiters, etc.) of the current character. The formatter 206 also defines a operator matrix U that records the operations selected for each i,j position in Q, where $U(i,j) \in \{-, I, D, R, M\}$. A state transformation matrix T defines the conditional probability computed for the previous operation, where the column is the previous transformation and the row is the current transformation. An example transformation matrix T is shown on Table (2) below.

TABLE 2

Example Transformation Matrix T

| T | — | M | R | I | D |
|---|---|---|---|---|---|
| M | 1.0000 | 1.0000 | 0.9990 | 0.9999 | 0.9999 |
| R | 0.7000 | 0.8000 | 0.9800 | 0.9000 | 0.9000 |
| I | 0.9200 | 0.9000 | 0.9000 | 0.9999 | 0.9000 |
| D | 0.9800 | 0.9800 | 0.9000 | 0.9000 | 0.9999 |

For example, if the previous operation was an insert operation (I) and the current operation is a deletion operation (D), the conditional probability may be 0.9000. Additionally, a character probability mapping $P_C$ for the characters of the operator product specifier is defined by the formatter 206. An example character probability mapping $P_C$ is shown on Table (3) below.

TABLE 2

Example Transformation Matrix T

| | $A_L$ | $N_L$ | $N_W$ | $D_L$ |
|---|---|---|---|---|
| $P_C$ | 1.00 | 0.98 | 0.30 | 1.00 |

On Table (3) above, $A_L$ is an alphabetic literal (e.g., A to Z), $N_L$ is a numeric literal (e.g., 0 to 9), $N_W$ is a numeric wild card (e.g., n) (e.g., the corresponding character in the operator product specifier is a numeric wild card), and $D_L$ is a literal delimiter (e.g., a space character, a comma, a forward slash, etc.).

The formatter 206 calculates $Q_I(i,j)$, $Q_D(i,j)$, $Q_R(i,j)$, and $Q_M(i,j)$ in accordance with Equation (2) through Equation (5) below.

$$Q_I(i,j)=Q(i-1,j)*T(I|U(i-1,j)*P_C(C|U(i,j))  \quad \text{Equation (2)}$$

$$Q_D(i,j)=Q(i,j-1)*T(D|U(i,j-1)*P_C(C|U(i,j))  \quad \text{Equation (3)}$$

$$Q_R(i,j)=Q(i-1,j-1)*T(R|U(i-1,j-1)*P_C(C|U(i,j))  \quad \text{Equation (4)}$$

$$Q_M(i,j)=Q(i-1,j-1)*T(M|U(i-1,j-1)*P_C(C|U(i,j))  \quad \text{Equation (5)}$$

The formatter 206 calculates the base probability ($P_B$) for the hypothesis corresponding to the format to be the conditional probability at the end of the transformation. For example, using the example transformation on Table (1) above, the formatter 206 may calculate the base probability ($P_B$) that the operator product specifier of "GSU 7388TW Seed" matches the format "GSUnnnnTAW" to be 81%. The example calculation is shown on Table (3) below

TABLE 3

Example Probability Matrix Q Based on the Example Transformation of Table (1)

| Q | — | G | S | U | _ | 7 | 3 | 8 | 8 | T | W |
|---|---|---|---|---|---|---|---|---|---|---|---|
| — | 1.00 | — | — | — | — | — | — | — | — | — | — |
| G | — | 1.00 | — | — | — | — | — | — | — | — | — |
| S | — | — | 1.00 | — | — | — | — | — | — | — | — |
| U | — | — | — | 1.00 | 0.98 | — | — | — | — | — | — |
| n | — | — | — | — | — | 0.96 | — | — | — | — | — |
| n | — | — | — | — | — | — | 0.94 | — | — | — | — |
| n | — | — | — | — | — | — | — | 0.92 | — | — | — |
| n | — | — | — | — | — | — | — | — | 0.90 | — | — |
| T | — | — | — | — | — | — | — | — | — | 0.90 | — |
| A | — | — | — | — | — | — | — | — | — | 0.81 | — |
| W | — | — | — | — | — | — | — | — | — | — | 0.81 |

The catalog matcher 208 analyzes the hypotheses generated by the formatter 206 when the variety database 144 includes format information and serial numbers for the manufacturer identified by the variety determiner 202. The catalog matcher 208 receives the hypotheses generated by the formatter 206. The catalog matcher 208 compares the formatted operator product specifiers in the hypotheses to serial numbers in the variety database 144. If catalog matcher 208 matches the one of the formatted operator product specifiers to one of the product specifiers in the variety database 144, the catalog matcher 208 sets a match probability ($P_M$) of that hypothesis to 100%. Otherwise, the catalog matcher 208 sets the match probability ($P_M$) of that hypothesis to 0%.

The hypothesis generator 210 generates a base hypothesis when either (a) the variety determiner 202 cannot identify the manufacturer based on the operator product specifier, or (b) the variety database 144 does not include the formats or the serial numbers associated with the manufacturer identified by the variety determiner 202. The base hypothesis generated by the hypothesis generator 210 includes the operator product specifier and a base probability ($P_B$). Because product specifiers generally have numerical characters, the hypothesis generator 210 calculates the base probability ($P_B$) based on the number of numerical characters in the operator product specifier. For example, an operator product specifier of "S23-981" is more likely to be a product specifier than an operator product specifier of "soy" or an operator product specifier of "12." The hypothesis generator 210 calculates the base probability ($P_B$) in accordance with Equation (6) below.

$$P_B = 1 - P_\varepsilon^k \qquad \text{Equation (6)}$$

In Equation (6) above, $P_\varepsilon$ is an independent error probability and k is lesser of (a) a quantity of numeric characters in the operator product specifier, or (b) threshold maximum number of numeric characters ($N_{MAX}$). In some examples, $N_{MAX}$ is between five numeric characters and seven numeric characters inclusive. In some examples, $P_\varepsilon^k$ is 0.90. For example, if the operator product specifier is "S23-981," the base probability ($P_B$) may be 41%, if the operator product specifier is "soy," the base probability ($P_B$) may be 0%, and if the operator product specifier is "12," the base probability ($P_B$) may be 19%.

The geographic analyzer 212 receives the base hypothesis from the hypothesis generator 210 and/or the set of hypotheses from the formatter 206. If the operator product specifier is in the field documentation data, there is a chance that the operator product specifier is correct, but is not in the variety database 144. The geographic analyzer 212 determines a geographic probability ($P_G$) to augment the base probability of the product specifiers in the hypothesis by searching for close matches in field documentation data stored in the geographic database 148 within the geographic neighborhood. The geographic analyzer 212 determines a geographic probability ($P_G$) based on (a) the length (l) of the product specifier, (b) a total quantity (n) of organizations (e.g., farms, growers, etc.) for a given growing season or time period or total percentage (u) of sampled organizations for a growing season or time period, and (c) a quantity (k) of those organizations with a matching product specifier within the geographic neighborhood.

Because different regions and different agricultural products have different usage patterns, the geographic analyzer 212 determines the total quantity (n) of organizations for a given growing season or time period in the geographic neighborhood (and as a result, the quantity (k) of organizations with a matching product specifier) based on (i) the quantity ($n_{FIPS}$) of organizations in the a political subdivision of a region (e.g., a county, a perish, a canton, etc.), (ii) a quantity ($n_{RAD}$) of organizations in a fixed radius (e.g., 100 kilometers, etc.) from the location identified by in the corresponding operator message 201, (iii) a quantity ($n_{SUC}$) of organizations in a radius of the from the location identified by in the corresponding operator message 201 in which the radius is expanded until a minimum quantity ($k_{min}$) of organizations with a matching product specifier are identified (e.g., $k_{min}$=10, etc.), or (iv) a quantity ($n_{QUAN}$) of organizations radius of the from the location identified by in the corresponding operator message 201 in which the radius is expanded until a $q^{th}$ quantile of all success has been observed (e.g., q=5%). The geographic probability ($P_G$) is determined in accordance with Equation (7) below.

$$P_G = \max \begin{Bmatrix} F_{bin}(n_{FIPS}; k_{FIPS}, p) \\ F_{bin}(n_{RAD}; k_{RAD}, p) \\ F_{bin}(n_{SUC}; k_{SUC}, p) \\ F_{bin}(n_{QUAN}; k_{QUAN}, p) \end{Bmatrix} \qquad \text{Equation (7)}$$

In Equation (7) above, $F_{bin}$ is the cumulative binomial distribution, and p is an excepted success probability. The excepted success probability (p) is calculated in accordance with Equation (8) below.

$$p = (1 - P_\varepsilon)^l \qquad \text{Equation (8)}$$

In Equation (8) above $P_\varepsilon$ is a probability constant and l is the length of the product specifier in the hypothesis. In some examples, the probability constant ($P_\varepsilon$) is 0.77. For example, if the product specifier is "S23-981," the excepted success probability (p) may be 0.00003.

The count analyzer 214 determines receives the base hypothesis from the hypothesis generator 210 and/or the set of hypotheses from the formatter 206. If the operator product specifier is in the field documentation data, there is a chance that the operator product specifier is correct, but is not in the variety database 144. The count analyzer 214 determines a field documentation data probability ($P_{FDD}$) based on (a) the length (l) of the product specifier, (b) a total quantity ($n_{ALL}$) of organizations (e.g., farms, etc.) in field documentation data, and (c) a quantity ($k_{ALL}$) of organizations with a matching product specifier as identified by the field documentation data. The field documentation data probability ($P_{FDD}$) is determined in accordance with Equation (9) below.

$$P_{FDD} = F_{bin}(n_{ALL}; k_{ALL}, p) \qquad \text{Equation (9)}$$

In Equation (9) above, p is calculated in accordance with Equation (8) above.

The historic analyzer 216 receives the base hypothesis from the hypothesis generator 210 and/or the set of hypotheses from the formatter 206. The historic analyzer 216 determines a historic probability ($P_H$) that the product specifier has been previously entered by the operator for the specific location. In some examples, the historic analyzer 216 does not calculate the historic probability ($P_H$) when at least one of the formatter 206, the catalog matcher 208, the geographic analyzer 212 or the count analyzer 214 have generated a hypothesis with a base probability that satisfies a threshold probability. In some such examples, the threshold probability is 70%. The historic analyzer 216 calculates the historic probability ($P_H$) in accordance with Equation (10) below.

$$P_H = P(F', S') * \frac{p_H}{N_H} \qquad \text{Equation (10)}$$

In Equation (10) above, P(F',S') is determined by recursively disambiguating historical entries related to the location in the field documentation data stored in the geographic database 148, $p_H$ is a fixed penalty term, and $N_H$ is a quantity of viable historic solutions (e.g., generate hypotheses that satisfy the threshold probability).

The normalizer 218 receives the hypotheses from the formatter 206, the catalog matcher 208, hypothesis generator 210, the geographic analyzer 212, the count analyzer 214 and the historic analyzer 216. The normalizer 218 determines an overall probability ($P_O$) (e.g., the statistical confidence). When the variety database 144 includes formats and serial numbers for products of the manufacturer identified by the variety determiner 202, the normalizer 218 calculates the overall probability ($P_O$) in accordance with Equation (11) below.

$$P_O = P_B * P_M \qquad \text{Equation (11)}$$

When either (a) the variety database 144 includes formats but not serial numbers of the manufacturer identified by the variety determiner 202, (b) the variety database 144 does not include formats and serial numbers of the manufacturer identified by the variety determiner 202, or (c) the variety determiner 202 cannot identify the manufacturer, the normalizer 218 calculates the overall probability ($P_O$) in accordance with Equation (12) below.

$$P_O = P_B * \max\{P_G, P_{FDD}, P_H\} \qquad \text{Equation (12)}$$

In some examples, the normalizer 218 eliminates hypotheses associated with an overall probability ($P_O$) that do not satisfy the threshold probability. In some such examples, the normalizer 218 retains the hypotheses associated with the highest overall probability ($P_O$) that does not satisfy the threshold probability based on minimum quantity of hypotheses. In some such examples, the minimum quantity of hypotheses is five. The normalizer 218 sends the set of modified product specifiers 220 based on the non-eliminated hypotheses to the first terminal 110 and/or the vehicle 112. In some examples, the modified product specifiers are ranked in order of their respective overall probability ($P_O$).

Figure 3:
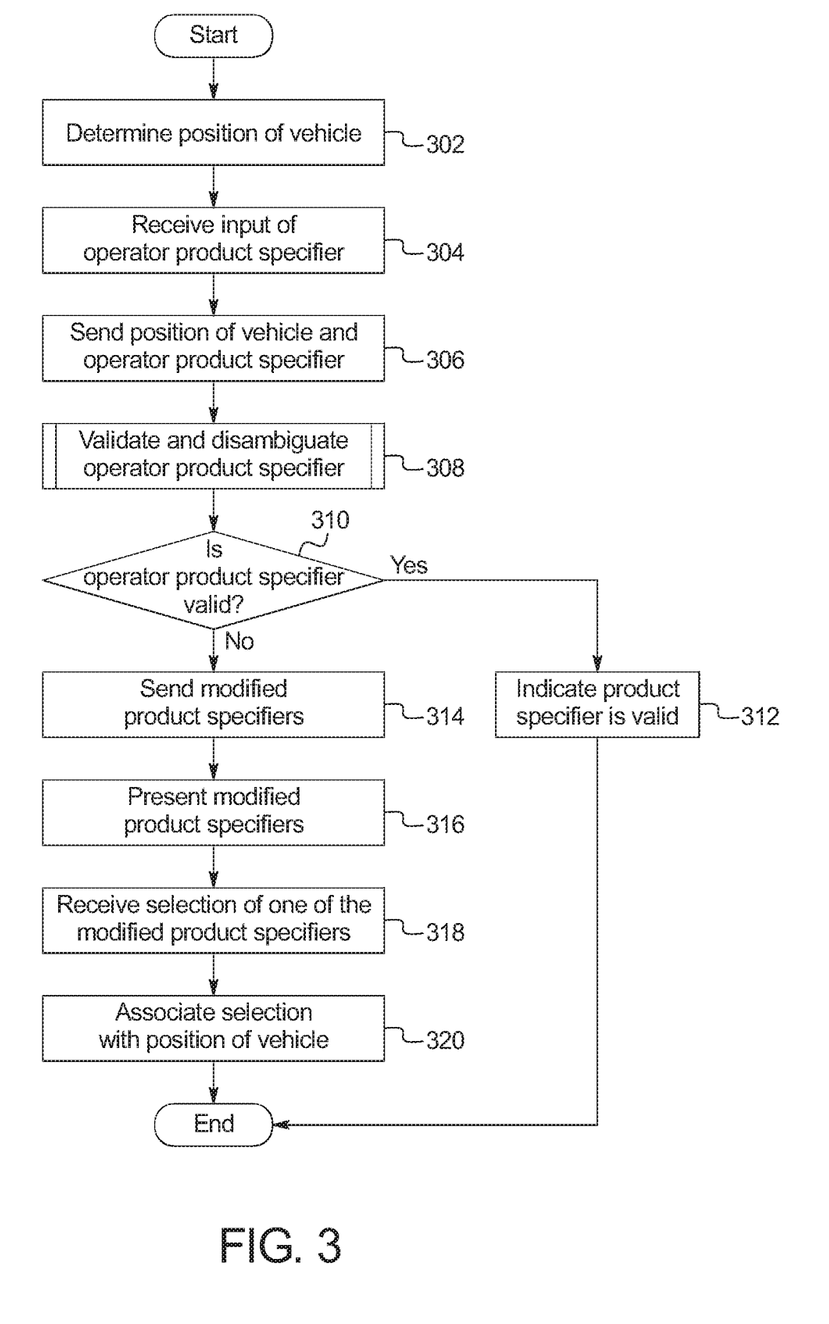
FIG. 3 is a flowchart of a method to implement the system of FIG. 1.

FIG. 3 is a flowchart of a method to implement the system 100 of FIG. 1. Initially, at block 302, the vehicle 112 determines it location via the GPS receiver 128. At block 304, the vehicle 112, via the user interface 132, receives an input of an operator product specifier. At block 306, the vehicle 112, via the vehicle wireless communication device 130, sends an operator message 201 to the central electronic data processing system 102 including the position determined at block 302 and the operator product specifier received at block 304.

At block 308, the central electronic data processing system 102, via the product disambiguator 150, validates and/or disambiguates the operator product specifier. If the product disambiguator 150 does not validate the operator product specifier, the product disambiguator 150 generates modified product specifiers associated with a probability that the operator product specifier was meant to be the modified product specifier. At block 310, the central electronic data processing system 102, via the product disambiguator 150, whether the operator product specifier is valid. The operator product specifier is valid if it matches a product specifier in the variety database 144. If the operator product specifier is valid, at block 312, the central electronic data processing system 102 indicates that the operator product specifier is valid. For example, central electronic data processing system 102 may add the operator product specifier associated with the location in the operator message 201 to a profile of the operator stored in the profile database 146.

If the operator product specifier is not valid, at block 314, the central electronic data processing system 102 sends the modified product specifiers, via the remote communications interface 118, to the first terminal 110 and/or the vehicle 112. At block 316, the first terminal 110, via the user interface 122, and/or the vehicle 112, via the user interface 132, presents the modified product specifiers to the operator. At block 318, the first terminal 110, via the user interface 122, and/or the vehicle 112, via the user interface 132, receives a selection of one of the modified product specifiers from the operator. At block 320, the central electronic data processing system 102 associated the selected one of the modified product specifiers with the location received in the operator message 201. In some examples, the central electronic data processing system 102 adds the selected modified product specifier to the profile of the operator stored in the profile database 146.

Figure 4:
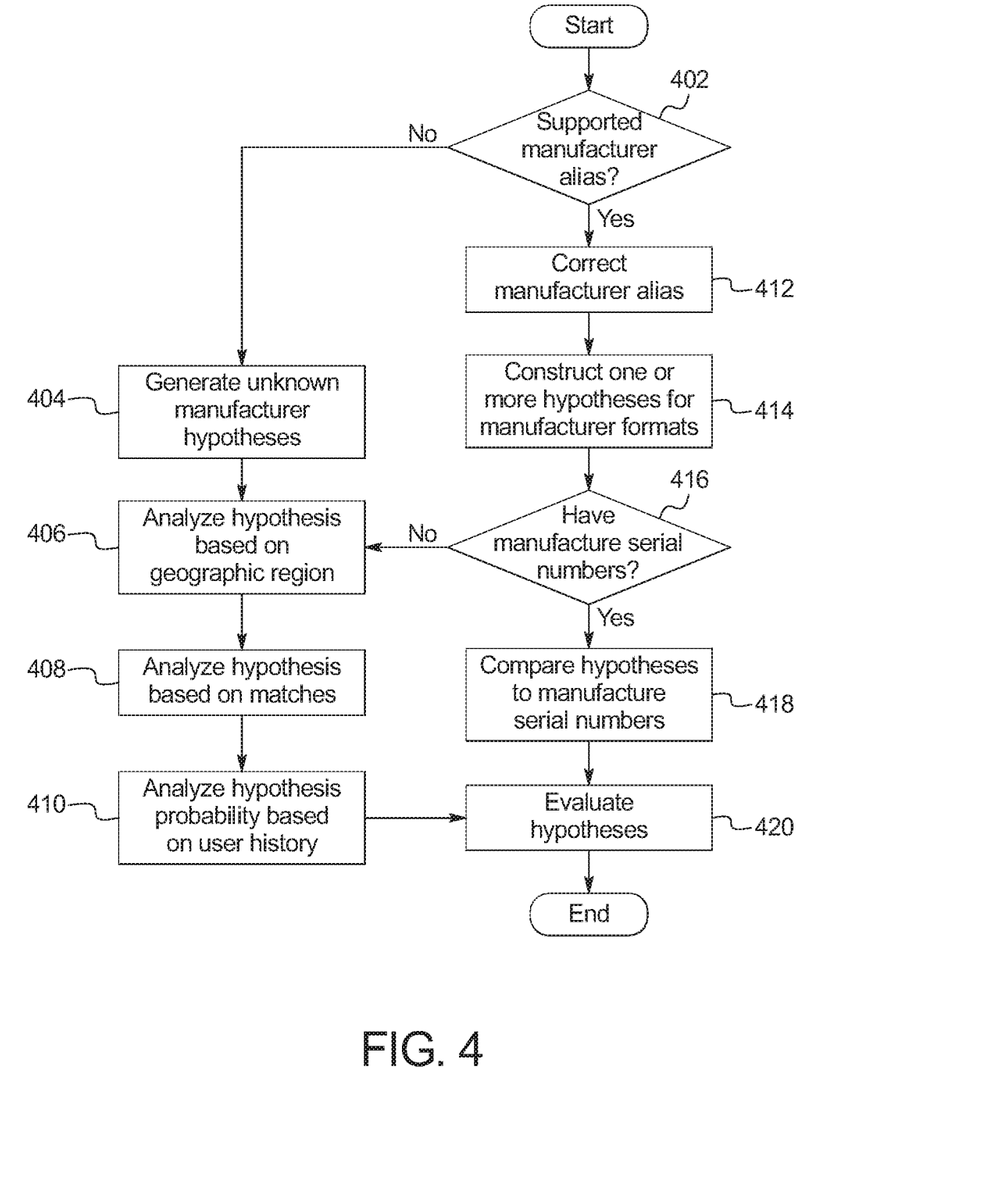
FIG. 4 is a flowchart of a method to implement the product disambiguator of FIGS. 1 and 2.

FIG. 4 is a flowchart of a method to implement the product disambiguator 150 of FIGS. 1 and 2. Initially, at block 402, the variety determiner 202 determines whether the operator product specifier includes a supported manufacturer alias. In some examples, the variety determiner 202 determines that the operator product specifier includes one of the supported manufacturer aliases when (a) a portion of the operator product specifier (e.g., a prefix, a suffix, etc.) matches a manufacturer list and (b) the variety database 144 does not include formats for the manufacturer. The manufacturer list includes official alias, common nick names and abbreviations of the official alias, and common mistakes for the official alias.

If the manufacturer alias is supported, the method continues at block 412. Otherwise, the manufacturer alias is not supported, the method continues at block 404. At block 404, the hypothesis generator 210 generates an unknown manufacture hypothesis that includes the operator product specifier and a base probability ($P_B$). In some examples, the base probability is determined in accordance with Equation (6) above. At block 406, the geographic analyzer 212 analyzes the hypothesis(es) based on the geographic region corresponding with the location associated with the operator product specifier. The geographic analyzer 212 determines a geographic probability ($P_G$) based on the total quantity (n) of organizations in a geographic neighborhood and the quantity (k) of organizations with that have entered a product specifier that matches the operator product specifier. In some examples, the geographic probability ($P_G$) is calculated in accordance with Equation (7) above.

At block 408, the count analyzer 214 analyzes the hypothesis(es) based the matches of the operator product specifier in the geographic database 148. The count analyzer 214 determines a field documentation data probability ($P_{FDD}$) based on (a) the length (l) of the product ($P_{FDD}$) specifier, (b) a total quantity ($n_{ALL}$) of organizations (e.g., farms, etc.) in field documentation data, and (c) a quantity ($k_{ALL}$) of organizations with a matching product specifier as identified by the field documentation data. In some examples, the field documentation data probability ($P_{FDD}$) is determined in accordance with Equation (9) above.

At block 410, the historic analyzer 216 analyses the hypothesis(es) based the matches of the operator product specifier in the profile of the operator stored in the profile database 146. The historic analyzer 216 determines a historic probability ($P_H$) that the product specifier has been previously entered by the operator for the specific location. In some examples, the historic analyzer 216 calculates the historic probability ($P_H$) in accordance with Equation (10) above.

At block 412, the alias corrector 204 replaces portions of the operator product specifier identified by the variety determiner 202 as a common nick name, abbreviation of the official alias, or common mistake for the official alias with the official alias. At block 414, the formatter 206 constructs one or more hypotheses based on the manufacturer alias identified by the variety determiner 202. The hypotheses each include a modified product specifier and a base probability ($P_B$). The modified product specifiers are derived from formats for product specifiers associated with the manufacturer stored in the variety database 144. The base probability ($P_B$) for a particular hypothesis is based on a transformation from the operator product specifier to the corresponding modified product specifier. In some examples, the formatter 206 calculates the base probability ($P_B$) in accordance with Equation (1) through Equation (5) above.

At block 416, the formatter 206 determines whether the variety database 144 includes the serial numbers for the manufacturer identified by the variety determiner 202. If the variety database 144 includes the serial numbers for the manufacturer, the method continues at block 418. Otherwise, if the variety database 144 does not include the serial numbers for the manufacturer, the method continues at block 406. At block 418, the catalog matcher 208 compares the modified product specifiers associated with the hypotheses generated at block 414 to the serial numbers for the manufacturer in the variety database 144. The catalog matcher 208 determines match probabilities ($P_M$) for the hypothesis. In some examples, the catalog matcher 208 sets the match probability ($P_M$) of a hypothesis to 100% when the modified product specifier matches one of the serial numbers in the variety database 144. Additionally, the catalog matcher 208 sets the match probability ($P_M$) of the hypothesis to 0% when the modified product specifier does not match any of the serial numbers in the variety database 144.

At block 420, the normalizer 218 evaluates the hypotheses by determining an overall probability ($P_O$) for the hypotheses. In some examples, the normalizer 218 calculates the overall probability ($P_O$) in accordance with Equation (11) above. Alternatively, in some examples, the normalizer 218 calculates the overall probability ($P_O$) in accordance with Equation (12) above. In some examples, the normalizer 218 eliminates hypotheses with an overall probability ($P_O$) that does not satisfy (e.g., is less than) a threshold probability.

The flowchart of FIG. 3 is representative of machine readable instructions that comprise one or more programs that, when executed by one or more processors (such as the remote data processor 114 and/or the data processor 124 of FIG. 1), cause the system 100 to implement the central electronic data processing system 102 and/or the vehicle 112 of FIG. 1. The flowchart of FIG. 4 is representative of machine readable instructions that comprise one or more programs that, when executed by one or more processors (such as the data processor 124 of FIG. 1), cause the central electronic data processing system 102 to implement the product disambiguator 150 of FIGS. 1 and 2. Further, although the example program(s) is/are described with reference to the flowcharts illustrated in FIGS. 3 and 4, many other methods of implementing the central electronic data processing system 102, the vehicle 112, and/or the example product disambiguator 150 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system configured to disambiguate agricultural input, the system comprising:
a central electronic data processing system communicatively coupled to a graphical user interface and a vehicle via a wireless communications network, wherein the vehicle includes vehicle electronics and a global positioning system receiver configured to determine a vehicle location, wherein the graphical user interface is operable to enter a first product specifier, wherein the central electronic data processing system includes:
a processor coupled to a storage device comprising a product disambiguator and a variety database, wherein the product disambiguator comprises logic to:
receive vehicle activity data from the vehicle electronics, the vehicle activity data including the first product specifier and the vehicle location,
generate a plurality of second product specifiers, the second product specifiers based on a portion of the first product specifier,
calculate a first probability for each of the second product specifiers using a minimum cost edit-distance transformation, the first probability indicating a likelihood that the corresponding one of the second product specifiers is correct,
modify the first probability of the one of the second product specifiers with a second probability in response to determining that one of the second product specifiers matches one of agricultural input identifiers for a manufacturer associated with the portion of the first product specifier in the variety database,
modify, via the processor, the corresponding first probability with a third probability different from the second probability and select one of a geographic probability or a field documentation probability to be the third probability in response to determining that the second product specifiers do not match one of the agricultural input identifiers for the manufacturer associated with the portion of the first product specifier in the variety database, compare each of the modified first probabilities with a threshold, and associate a the one of the second product specifiers associated with the highest one of the modified first probabilities that satisfies the threshold with the vehicle location, wherein the one of the second product specifiers associated with the highest one of the modified first probabilities that satisfies the threshold associated with the vehicle location is a corrected product specifier, and display, via the graphical user interface, the corrected product specifier as a candidate to replace the first product specifier, and store the corrected product specifier in the storage device as a replacement product specifier when the corrected product specifier is selected via the graphical user interface.

2. The system of claim 1, wherein the central electronic data processing system is configured to set the second probability of the corresponding one of the plurality of second product specifiers to one when the second product specifier matches one of agricultural input identifiers in the variety database associated with the portion of the first product specifier.

3. The system of claim 1, wherein the central electronic data processing system is configured to determine at least one of the geographic probability or the field documentation probability.

4. The system of claim 3, wherein the geographic probability is based on a geographic neighborhood of the geographic location.

5. The system of claim 3, wherein the field documentation probability is based on records in a geographic database that include the corresponding second product specifier.

6. The system of claim 1, wherein the central electronic data processing system is configured to generate each of the second product specifiers based on the first product specifier received from the vehicle electronics and one of a plurality of formats defined by a format the manufacturer stored in the variety database.

7. The system of claim 6, wherein the minimum cost edit-distance transformation that determines the first probability is based on an ordered sequence of transformation steps from the first product specifier to the second product specifier.

8. The system of claim 1, wherein the second product specifier identifies at least one of a seed, a fertilizer, or a pesticide.

9. The system of claim 1, wherein the central electronic data processing system is configured to transmit the second product specifier associated with the highest one of the modified first probabilities to the vehicle electronics, wherein in response to receiving the second product specifier associated with the highest one of the modified first probabilities and a confirmation input by a user, the vehicle electronics is to automatically modify of a dispersal rate of an agricultural product by the vehicle electronics based on the received second product specifier.

10. The system of claim 1, wherein the system is configured to adjust an application of agricultural product applied by the vehicle to correspond with the corrected product specifier when the corrected product specifier is selected via the graphical user interface.

11. A non-transitory computer readable medium comprising a product disambiguator, within a central electronic data processing system communicatively coupled with vehicle electronics of a vehicle via a wireless communication network, wherein the product disambiguator is configured to disambiguate agricultural input to correct vehicle activity data corresponding to the vehicle, wherein the non-transitory computer readable medium further comprises:

a formatter to:
receive the vehicle activity data from the vehicle electronics, wherein the vehicle electronics includes a global positioning system receiver to determine a vehicle location, and wherein the vehicle electronics is communicatively coupled to a graphical user interface operable to enter a first product specifier, the vehicle activity data including the first product specifier and the vehicle location;

generate a plurality of second product specifiers, the second product specifiers based on a portion of the first product specifier;

calculate a first probability for each of the second product specifiers using a minimum cost edit-distance transformation, the first probability indicating a likelihood that the corresponding one of the second product specifiers is correct; and a normalizer to:
in response to determining that one of the second product specifiers matches one of agricultural input identifiers for a manufacturer associated with the portion of the first product specifier in a variety database, modify the first probability of the one of the second product specifiers with a second probability;

in response to determining that the second product specifiers do not match one of the agricultural input identifiers for the manufacturer associated with the portion of the first product specifier in the variety database, modify the corresponding first probability with a third probability different from the second probability, wherein the third probability comprises one of a geographic probability or a field documentation probability;

compare each of the modified first probabilities with a threshold; and associate the one of the second product specifiers associated with the highest one of the modified first probabilities that satisfies the threshold with the vehicle location, wherein the one of the second product specifiers associated with the highest one of the modified first probabilities that satisfies the threshold associated with the vehicle location is a corrected product specifier, send, to the graphical user interface, the corrected product specifier as a candidate to replace the first product specifier, and store the corrected product specifier as a replacement product specifier when the corrected product specifier is selected via the graphical user interface.

12. The non-transitory computer readable medium of claim 11 wherein the product disambiguator further includes a catalog matcher to:

set the second probability of the corresponding one of the plurality of second product specifiers to one when the second product specifier matches one of agricultural input identifiers in the variety database associated with the portion of the first product specifier; and set the second probability of to the corresponding one of the plurality of second product specifiers to zero when the second product specifier does not match one of agricultural input identifiers in the variety database associated with the portion of the first product specifier.

13. The non-transitory computer readable medium of claim 11 wherein the product disambiguator further includes:
    a geographic analyzer to determine the geographic probability; and
    a count analyzer to determine the field documentation probability.

14. The non-transitory computer readable medium of claim 13, wherein the geographic probability is based on a geographic neighborhood of the geographic location.

15. The non-transitory computer readable medium of claim 13, wherein the field documentation probability is based on records in a geographic database that include the corresponding second product specifier.

16. The non-transitory computer readable medium of claim 11, wherein the formatter is to generate each of the second product specifiers based on the first product specifier received from the vehicle electronics and one of a plurality of formats defined by a format the manufacturer stored in the variety database.

17. The non-transitory computer readable medium of claim 16, wherein the minimum cost edit-distance transformation determines the first probability is based on an ordered sequence of transformation steps from the first product specifier to the second product specifier.

18. The non-transitory computer readable medium of claim 11, wherein the second product specifier identifies at least one of a seed, a fertilizer, or a pesticide.

19. A non-transitory tangible computer readable medium comprising instructions that, when executed, cause a server to:
    receive, by a product disambiguator within a central electronic data processing system for providing disambiguation of agricultural input, vehicle activity data from vehicle electronics associated with a vehicle, wherein the vehicle electronics is communicatively coupled to the product disambiguator and a graphical user interface via a wireless communication network, wherein the vehicle electronics includes a global positioning system receiver configured to determine a vehicle location, the vehicle activity data including a first product specifier and the vehicle location;
    generate, by the product disambiguator, a plurality of second product specifiers, the second product specifiers based on a portion of the first product specifier;
    calculate, by the product disambiguator, a first probability for each of the second product specifiers using a minimum cost edit-distance transformation, the first probability indicating a likelihood that the corresponding one of the second product specifiers is correct;
    in response to determining that one of the second product specifiers matches one of agricultural input identifiers for a manufacturer associated with the portion of the first product specifier in a variety database, modify, by the product disambiguator, the first probability of the one of the second product specifiers with a second probability;
    in response to determining that the second product specifiers do not match one of the agricultural input identifiers for the manufacturer associated with the portion of the first product specifier in the variety database, modify, by the product disambiguator, the corresponding first probability with a third probability different from the second probability, wherein the third probability comprises one of a geographic probability or a field documentation probability;
    compare, by the product disambiguator, each of the modified first probabilities with a threshold; and
    associate, by the product disambiguator, the one of the second product specifiers associated with the highest one of the modified first probabilities that satisfies the threshold with the vehicle location, wherein the one of the second product specifiers associated with the highest one of the first modified probabilities that satisfies the threshold associated with the vehicle location is a corrected product specifier,
    send, to the graphical user interface, the corrected product specifier as a candidate to replace the first product specifier, and
    store the corrected product specifier as a replacement product specifier when the corrected product specifier is selected via the graphical user interface.

20. The non-transitory tangible computer readable medium of claim 19, wherein the instructions, when executed, cause the server to:
    set the second probability of to the corresponding one of the plurality of second product specifiers to one when the second product specifier matches one of agricultural input identifiers in the variety database associated with the portion of the first product specifier; and
    set the second probability of to the corresponding one of the plurality of second product specifiers to zero when the second product specifier does not match one of agricultural input identifiers in the variety database associated with the portion of the first product specifier.

21. The non-transitory tangible computer readable medium of claim 19, wherein the instructions, when executed, cause the server to, for the plurality of second product specifiers:
    determine the corresponding geographic probability;
    determine the corresponding field documentation probability;
    select one of the geographic probability or the field documentation probability to be the corresponding third probability.

22. The non-transitory tangible computer readable medium of claim 21, wherein the geographic probability is based on a geographic neighborhood of the geographic location.

23. The non-transitory tangible computer readable medium of claim 21, wherein the field documentation probability is based on records in a geographic database that include the product specifier.

24. The non-transitory tangible computer readable medium of claim 19, wherein the instructions, when executed, cause the server to generate each of the second product specifiers based on the first product specifier received from the vehicle electronics and one of a plurality of formats defined by a format the manufacturer stored in the variety database, the minimum cost edit-distance transformation determining the first probability is based on an ordered sequence of transformation steps from the first product specifier to the second product specifier.

* * * * *